United States Patent [19]

Liedenbaum et al.

[11] Patent Number: 5,739,937
[45] Date of Patent: Apr. 14, 1998

[54] OPTICAL UNIT FOR RESTORING A PULSE PATTERN, RECEIVER SUITABLE FOR USE IN A TRANSMISSION SYSTEM COMPRISING SUCH A UNIT

[75] Inventors: Coen T. H. F. Liedenbaum; John J. E. Reid, both of Eindhoven, Netherlands

[73] Assignee: U.S. Philips Corporation, New York, N.Y.

[21] Appl. No.: 532,123

[22] Filed: Sep. 22, 1995

[30] Foreign Application Priority Data

Sep. 23, 1994 [EP] European Pat. Off. ............ 94202745

[51] Int. Cl.⁶ .................................................. H04B 10/00
[52] U.S. Cl. ........................... 359/161; 359/154; 359/189
[58] Field of Search .................................. 359/154, 161, 359/180–181, 184–186, 189, 194, 188, 195; 372/29–30, 25

[56] References Cited

U.S. PATENT DOCUMENTS

| | | | |
|---|---|---|---|
| 4,399,564 | 8/1983 | Cowen | 359/184 |
| 4,980,891 | 12/1990 | Izadpanah | 372/25 |
| 5,309,269 | 5/1994 | Shibao | 359/187 |
| 5,373,387 | 12/1994 | Bosch et al. | 359/187 |
| 5,568,303 | 10/1996 | Liedenbaum et al. | 359/184 |

OTHER PUBLICATIONS

"Clock extraction using saturable absorption in a semiconductor non-linear optical amplifier" by P.E. Barnsely et al in IEEE Photonics Technology Letters, vol. 3, No. 9, Sep. 1991, pp. 832–834.

*Primary Examiner*—Kinfe-Michael Negash
*Attorney, Agent, or Firm*—Daniel E. Tierney

[57] ABSTRACT

An optical unit for restoring a pulse pattern is described. The unit has an input for receiving a signal pulse series at a modulation period T and wavelength $\lambda hd\ p$ and comprises a pulsed laser for supplying a pulse series whose distance between two consecutive pulses is equal to n.T, in which n is an integer and is variable throughout the pulse series. Pulses of the signal pulse series can be injected into the pulsed laser. Moreover, the unit comprises at least a detection system arranged in the path of the radiation emitted by the pulsed laser, which system detects on the basis of a variation of a feedback-sensitive parameter of the laser.

15 Claims, 2 Drawing Sheets

OPTICAL UNIT FOR RESTORING A PULSE PATTERN, RECEIVER SUITABLE FOR USE IN A TRANSMISSION SYSTEM COMPRISING SUCH A UNIT

BACKGROUND OF THE INVENTION

1. Field of the Invention

The invention relates to an optical unit for restoring a pulse pattern, having an input for receiving a signal pulse series at a modulation period T and wavelength $\lambda_p$, and comprising a non-linear optical element for supplying a plurality of pulses in accordance with the signal pulse series.

The invention also relates to an optical transmission system whose receiver is provided with such an optical unit.

2. Discussion of the Related Art

An optical unit of the type described in the opening paragraph is known from, for example the article: "Clock extraction using saturable absorption in a semiconductor non-linear optical amplifier" by P. E. Barnsley and P. J. Fiddyment in IEEE Photonics Technology Letters, vol. 3, no. 9, September 1991, pp. 832–834. The unit described in this article may be used, for example in receivers of optical telecommunication systems for clock regeneration. In such systems it is important that the clock signal is stable in order to detect as flawlessly as possible. The clock signal is the repetition time at which the data pattern arriving in the receiver is detected or at which the incoming bit is a digital "0" or a digital "1".

In present-day optical telecommunication systems the aim is, inter alia, an increasing data transmission rate. Since the pulse width of the bits decreases with increasing rates, time jitter will be more detrimental than at low transmission rates. Time jitter means that the pulse position is inaccurately defined with respect to the pulse period and occurs due to instabilities in the transmission system so that a variation of the position of the signal pulses along the time axis is produced. On the other hand, the clock signal is determined from an average value of a plurality of pulse periods of the signal pulse series. Due to the spread of signal pulses with respect to time, caused by system instabilities, the signal pulse and an associated pulse of the clock signal will not always coincide and, particularly at high transmission rates, give rise to erroneous information in the receiver.

The optical unit described in the above-mentioned article comprises a non-linear optical amplifier to which an optical data pulse series to be transported is applied via a non-linear absorbing element. On the one hand, this element plays the role of a photodetector, because it is connected to a high-frequency electrical filter which generates a clock signal in an electronic manner with reference to the pulses received by the element. On the other hand, the element plays the role of an optical switch. When a pulse representing a digital "1" reaches the element, the absorbing element will be temporarily saturated and subsequently a part of the pulse will be passed on to the amplifier. The pulse frequency of the data signal passed by the amplifier, which frequency corresponds to the modulation period of the signal pulse series, is determined by means of a photodetector. The signals of the last-mentioned photodetector and of the high-frequency filter are applied to a bit-error-rate detector with which the quality of the transmission system can be determined in known manner.

A drawback of this unit is that not only the pulses of the pulse series applied to the amplifier but also the intensity noise and time jitter present in the series will be amplified. Moreover, a high-frequency filter should be used to generate a stable clock signal. Such a filter is, however, difficult to manufacture for the desired high transmission rates. Moreover, the unit known from said article is very much dependent on intensity. The extinction ratio, i.e. the ratio between the intensity of a digital "1" and the intensity of a digital "0" should be maintained sufficiently high in order that a clear distinction can be made between a "1" and a "0", particularly for NRZ data. This means that a digital "1" should have a sufficient intensity to saturate the non-linear optical absorbing element and that a digital "0" should not have too much intensity in order that the non-linear optical element remains unsaturated.

SUMMARY OF THE INVENTION

It is an object of the invention to provide an optical unit with which a pulse pattern can be regenerating in a stable manner and whose components are simple. Moreover, intensity noise and time jitter in the pulse series produced after restoration are greatly reduced.

To this end the optical unit according to the invention is characterized in that the non-linear optical element is a pulsed laser which is adapted to supply a pulse series whose distance between two consecutive pulses is equal to n.T, in which n is an integer and is variable throughout the pulse series, into which laser pulses of the signal pulse series can be injected, and in that the unit further comprises a detection system in the path of the radiation emitted by the pulsed laser for measuring a variation of a feedback-sensitive parameter of the laser.

The distance between two consecutive pulses is the distance along the time axis measured between the starting instants of these pulses.

Laser light may be considered as an electromagnetic wave having a given optical frequency, phase and amplitude variation, all of which are, in principle, time-dependent.

The present invention is based on the recognition that the behaviour of the laser and hence the pulse series supplied by this laser can be influenced by applying external laser light to the active medium of a diode laser. Variations of the behaviour of the laser are, inter alia, noticeable from the three above-mentioned parameters.

Intensity noise and time jitter are greatly reduced because only a sample of the injected pulse of the signal pulse series is taken by the pulsed laser. The signal pulses at the output of the pulsed laser are thus always available as standard pulses and thus relatively easy to detect.

A further advantage of the unit according to the invention is that the injected signal pulse series may be both a RZ (Return-to-Zero) and a NRZ (Non-Return-to-Zero) data series because only a selective part of the pulses of the pulse pattern to be regenerating is used for sampling, viz. that part which must be injected into the pulsed laser in the relevant time interval.

A preferred embodiment of the optical unit according to the invention is characterized in that the pulses of the signal pulse series can be injected into the pulsed laser at instants for which it holds that $E(P_m)>E(LP_i)$, in which $E(P_m)$ is the energy injected into the laser at the relevant instant and $E(LP_i)$ is the energy for the dominant mode built up in the laser at the relevant instant.

The dominant mode is understood to mean the mode for which the optical losses in the resonant cavity are minimal.

A laser is sensitive to external photons, predominantly in the time intervals in which optical pulses are built up.

Outside these time intervals, there is generally not enough amplification to maintain the injected light above the level of the spontaneous emission, or the laser has already built up a too strong field itself, which field can hardly be changed by external radiation. By injecting a sufficient number of photons within these time intervals, these extra photons will determine the behaviour of the laser. The laser may even be controlled in this way.

A first embodiment of the optical unit according to the invention is characterized in that the detection system comprises a wavelength discriminator.

In this case only the wavelength of the injected pulse is important. If the external radiation is injected into the pulsed laser at the suitable instant, the wavelength of the injected pulse will be taken over. The pulse supplied by the pulsed laser always has the same shape and intensity, independent of the shape and intensity of the signal pulse injected into the pulsed laser. Thus, the signal pulse series presented to the unit is automatically and at least partly regenerated.

A further embodiment of the optical unit according to the invention is characterized in that the pulsed laser is a diode laser having a Fabry-Pérot resonant cavity with an natural wavelength which corresponds to the wavelength of the signal pulse series.

By ensuring that the pulsed laser of the optical unit is a diode laser with a Fabry-Pérot resonant cavity, an natural wavelength of which corresponds to the wavelength of the signal pulse series, an optimum coupling of the signal pulse series into the pulsed laser will be achieved.

A second embodiment of the optical unit according to the invention is characterized in that the detection system comprises an interferometer.

In this embodiment the coherence of the laser is the parameter from which the variation of the behaviour of the laser can be measured and with which the laser can be controlled.

The coherence of a laser can be determined by measuring the visibility parameter in a Michelson interferometer. Light coming from the laser is split into two branches, with the travel times in the two branches being rendered different from each other. Subsequently the light from the two branches is combined again. The result is an interference pattern with minima and maxima which can be measured by means of a powermeter. The visibility is defined as $$V = (I_{max} - I_{min})/(I_{max} + I_{min})$$

in which $I_{max}$ and $I_{min}$ are the maximum and minimum intensities, respectively, of the interference pattern. The variation of the visibility as a function of the path length difference between the two branches is a measure of the coherence of the laser source. By injection of external laser light, the coherence will be changed.

It will consequently be clear from the change of the coherence whether the supplied bit is a digital "0" or a digital "1". In fact, the coherence remains unchanged at a digital "0".

A third embodiment of the optical unit according to the invention is characterized in that the detection system comprises a photodetector whose output signal is comparable in pulse period and phase with the pulse period and phase of the pulse series supplied by the pulse laser without injection.

A third parameter which may be influenced by injection of external laser light is the instant when the pulsed laser supplies a pulse. A laser which is driven by a current pulse requires a given period of time, referred to as the delay time, to generate an optical pulse in response to the current pulse. This delay time is, inter alia very much dependent on the losses in the laser resonant cavity. The larger the losses, the longer it will take before an optical pulse is emitted after a current pulse has been supplied. When external laser light is injected into the resonant cavity at the suitable instant, the losses for the injected wavelength are decreased and the delay time will be shorter. The change of delay time is measurable as a phase shift between the pulse supplied by the pulsed laser without injection and the corresponding pulse supplied by the pulsed laser after injection. This phase shift is measured, for example by comparing the electric control signal for the pulsed laser with the electric signal obtained by converting the pulse series supplied by the pulsed laser after injection. To this end, these signals may be applied to an electronic mixer.

A further embodiment of the optical unit according to the invention is characterized in that the pulsed laser is a monomode laser.

A monomode laser, for example a DFB (Distributed Feedback) laser is very suitable as a pulsed laser, particularly for wavelength demultiplexing systems, if the parameter used is the delay time or the coherence. In fact, DFB laser characteristics are much less sensitive to injection of radiation at a wavelength different from the DFB wavelength. The use of filters may be obviated thereby.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
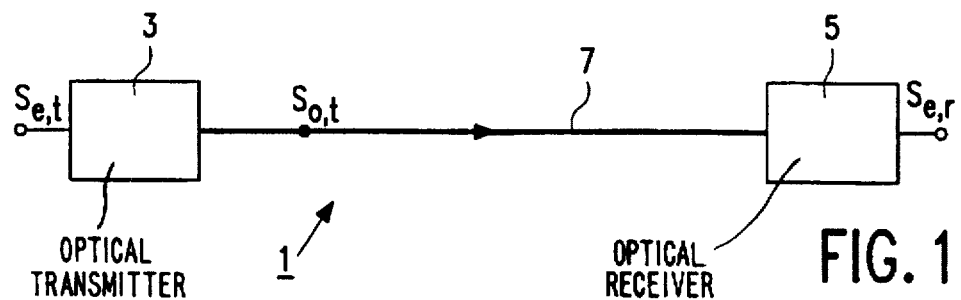
FIG. 1 shows diagrammatically an optical transmission system according to the invention.

The optical transmission system 1 shown diagrammatically in FIG. 1 comprises an optical transmitter 3 and an optical receiver 5 between which a transmission medium 7 is present, for example an optical fiber. A digital electric signal $S_{e,t}$ to be transmitted is applied to the optical transmitter 3. This signal is converted into optical pulses $S_{o,t}$ in the transmitter 3. The output of the transmitter 3 is connected to an input of the transmission medium 7, the output of which is connected to an input of the receiver 5. After transport of the optical pulses through the transmission medium 7, the optical pulses are converted in the receiver 5 into a digital electric signal $S_{e,r}$ which is available at the output of the receiver 5.

In present-day transmission systems the aim is, inter alia a higher transmission rate. This rate is, however, limited by, inter alia the available bandwidths in the current processing electronics which are commercially available at an acceptable price. If the transmission rate is to be increased, more than one signal should be sent through a single channel. To this end, different signals are to be combined in the same transmission channel at the transmitter end. At the receiver end, the composite signal should be split up again into different signals having a bandwidth level which can be realised by said electronics. Moreover, in the receiver a stable clock signal is to be extracted from the incoming data pattern in order to realise the detection as smoothly as possible. The clock signal determines the repetition time detecting whether the incoming bit of the data pattern arriving at the receiver is a digital "0" or a digital "1". However, at the desired high transmission rates it is relatively difficult to detect without errors because the pulse width of the bits decreases with an increasing rate and consequently time jitter will have a more detrimental influence than at low rates where the bit width is larger. Time jitter implies that the pulse position and the pulse period are inaccurately defined with respect to each other. It is caused by the fact that due to instabilities in the transmission system a variation of the position of the signal pulses will occur along the time axis. On the other hand, the clock signal is determined from an average value of a plurality of pulse periods of the signal pulse series. Due to the spread, caused by system instabilities, of the signal pulses with respect to time, a signal pulse and an associated pulse of the clock signal will not always coincide and give rise to erroneous information in the receiver.

The present invention proposes a unit with which, inter alia a stable clock signal can be generated in an optical manner and a signal pulse series can be split into different sub-signal pulse series.

Figure 2:
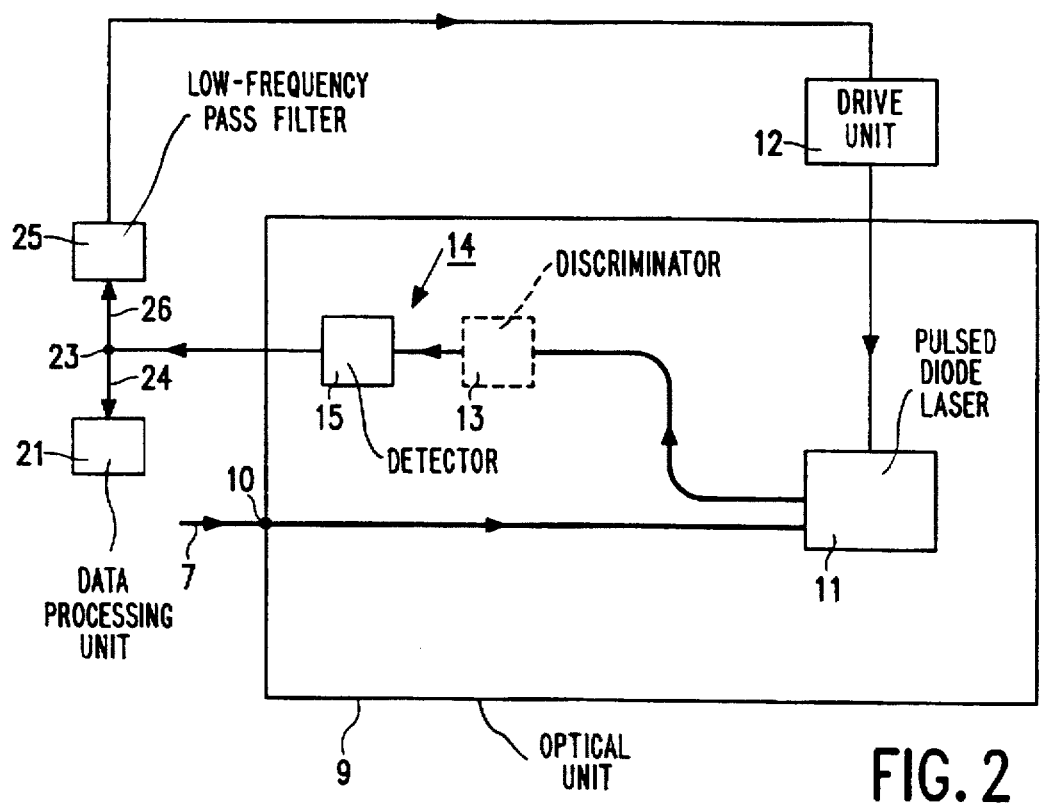
FIG. 2 shows diagrammatically an optical unit for recognizing a pulse pattern according to the invention.

FIG. 2 shows diagrammatically an optical unit 9 according to the invention. The unit 9 comprises a pulsed diode laser 11 which is driven by a drive unit 12, for example a laser power supply unit, at a frequency which is such that a pulse series is produced whose distance T' between two consecutive pulses is equal to or an integral multiple of the modulation period T of the transported signal pulse series, in other words T'=n·T, in which n is an integer and is variable throughout the pulse series.

The pulsed laser 11 is driven, for example by means of gain switching. In this mode, current pulses are applied to the diode laser which in its turn emits optical pulses. Moreover, the unit 9 has an input for receiving a signal pulse series in which at least a part of the pulse pattern must be regenerating.

The signal pulse series coming from the transmitter 3 and transported via the transmission medium 7 is conveyed, for example at a wavelength or wavelength band $\lambda_p$. By injecting the pulses of this series into the pulsed laser 11, the behaviour of the pulsed laser 11 is influenced.

Use is made of the sensitivity of lasers to photons which reach the active medium of the laser. The laser can even be controlled in this way.

Since the behaviour of the laser is predominantly determined by what happens in the time intervals in which an optical pulse is built up, the injection into the pulsed laser 11 is preferably realised at instants when it holds that $E(P_m)$ >$E(LP_i)$. $E(P_m)$ is the energy injected into the pulsed laser 11 at the relevant instant and $E(LP_i)$ is the energy for the dominant mode built up in the pulsed laser 11 at the relevant instant. The dominant mode is the mode for which the optical losses in the resonant cavity are minimal. At instants other than those mentioned, there is generally not enough amplification to maintain the injected light above the level of the spontaneous emission, or the laser has already built up a too strong field itself, which field can hardly be changed by external radiation. By injecting a sufficient number of photons at said instant, these extra photons will determine the behaviour of the laser.

Parameters from which changes of the behaviour of the laser are measurable are, inter alia the wavelength, the coherence and the instant when a pulse is generated by the laser.

An advantage of the optical unit according to the invention is that the signal pulse series which is applied to the unit 9 and whose pulse pattern must be recognized may consist of NRZ (Non-Return-to-Zero) data or RZ (Return-to-Zero) data. Only a selective part of the pulse, viz. that part which is injected into the pulsed laser at the relevant instant is utilized during sampling.

Furthermore, a detection system 14 detecting on the basis of the change of one of the above-mentioned feedback-sensitive parameters is incorporated in the unit 9 in the path of the radiation supplied by the pulsed laser 11. If the used feedback-sensitive parameter is the wavelength or the coherence of the pulsed laser 11, the detection system comprises a discriminator 13 which is followed by a detector 15 for converting the optical signal supplied by the discriminator 13 into an electric signal. If the used parameter is the instant when the pulsed laser 11 supplies a pulse, it is sufficient to use a detector 15 only. The discriminator 13 is therefore shown in broken lines in the Figures. The detector 15 may be present both within the optical unit 9, as is shown in the Figures, and outside this unit.

If the parameter is the wavelength of the pulsed laser 11, the discriminator 13 will be a wavelength discriminator which selects pulses of the wavelength or wavelength band in accordance with the wavelength or wavelength band $\lambda_p$ of the transmitted signal pulse series. This selection may be realised, for example by rendering the wavelength of the discriminator 13, i.e. the wavelength which is passed, equal to $\lambda_p$ so that all other wavelengths are blocked. In this way, a pulse series whose pulse pattern corresponds to at least a part of the pulse pattern of the original signal pulse series appears at the output of the discriminator 13. All pulses of this series have the same quality determined by the diode laser, so that the presented pulse series is enhanced or regenerated. It may also be ensured that all radiation is passed, except that at wavelength band $\lambda_p$. In this way a pulse series whose pulse pattern is at least partly complementary to that of the original signal pulse series appears at the output of the discriminator 13.

The electric signal from the detector 15 is subsequently split, for example, outside the optical unit into two branches 24, 26 by means of an electric splitter 23. One of the branches 24 comprises a data processing unit 21 in which the regenerated signal pulse series is processed for user purposes. In the second branch 26, which is connected to the drive unit 12 of the pulsed laser 11, it is determined in how far the modulation period T of the transported signal pulse series on the one hand and the distance in time T' between two consecutive pulses from the pulsed laser 11 on the other hand, if driven by the drive unit 12, are in conformity with each other. This provides different possibilities.

A first possibility, as shown in FIG. 2, is to provide a second branch 26 with a low-frequency pass filter 25. If the drive unit 12 has such a frequency that the pulsed laser 11 generates a pulse series whose pulse distance in time is not equal to or is not an integral multiple of the modulation period T of the signal pulse series, the radiation emitted by the pulsed laser 11 will comprise a signal whose frequency is equal to the difference frequency between the two pulse series, which signal is referred to as beat signal. This signal is passed by the low-frequency pass filter 25 and applied to the drive unit 12, for example a VCO (Voltage-Controlled Oscillator) by means of which the frequency of the drive unit 12 and thus the pulse period of the pulsed laser 11 is corrected and rendered equal to that of the data pulse series. If the two frequencies are equal, the beat signal will be equal to zero.

A second possibility is to replace the low-frequency pass filter 25 in the second branch 26 by a high-frequency pass filter. In that case the drive unit 12 comprises, for example an amplifier for amplifying the passed pulse pattern, followed by a phase shifter in the form of an adjustable delay line. By adjusting this delay line in such a way that the signal level at the output of the detector is as high as possible, it is achieved that the pulses of the data pulse series are presented within the time windows within which the pulses in the diode laser are built up.

The pulsed laser 11 should have such a wavelength that coupling of the signal pulse series of wavelength or wavelength band $\lambda_p$ prevails over the internal coupling of this pulsed laser and that this laser 11 is thus forced to work at a wavelength other than its natural wavelength. Coupling of the signal pulse series into the pulsed laser 11 is, however, optimal if the pulsed laser is a diode laser having a Fabry-Pérot resonant cavity, in which $\lambda_p$ corresponds to a non-active mode fitting in the resonant cavity.

A change of behaviour of the pulsed laser 11 may also be determined from the coherence of the laser instead of from the wavelength of the pulsed laser. The coherence of a laser may be determined by measuring the visibility parameter in a Michelson interferometer. The light coming from the laser is split into two branches, with the travel times in the two branches being rendered different from each other. Subsequently, the light of the two branches is combined again. The result is an interference pattern with minima and maxima which can be measured with a powermeter. The visibility is defined as $$V = (I_{max} - I_{min})/(I_{max} + I_{min})$$

in which $I_{max}$ and $I_{min}$ are the maximum and minimum intensities, respectively, of the interference pattern. The variation of the visibility as a function of the path length difference is a measure of the coherence of the laser source. At a digital "1", in other words in the presence of a pulse in the signal pulse series to be regenerated, there is a change of coherence, whereas this will not be the case at a digital "0". The powermeter which measures the output of the interferometer supplies an electric signal which will indicate at which frequency there is a change of coherence. If this frequency differs from the frequency at which the pulsed laser 11 is driven, the radiation is supplied by the pulsed laser will further comprise a signal having a long pulse period, which signal is referred to as beat signal, which can be detected in the manner as described above and may serve as a feedback signal for setting the frequency at which the pulsed laser is driven.

Another parameter which can be influenced by injection of external photons is the instant when pulses are generated by the pulsed laser. For a laser modulated by means of a current, the time between the electric pulse supplied to the laser and the optical pulse generated by the laser will vary, dependent on the losses in the resonant cavity. By injecting external light into the resonant cavity at a suitable moment, the losses for the injected wavelength are reduced and consequently the delay time will be shorter. In this way the delay time will be shorter for the relevant wavelength whenever a signal pulse, in other words a digital "1", is injected into the laser. In this case it is determined by which period the delay time will be shorter. If this period is not equal to or an integral multiple of the modulation period of the signal pulse series, a beat signal is produced at the output of the pulsed laser 11. This signal can be used again to render the frequencies of the pulsed laser 11 and those of the signal pulse series equal.

In the three possibilities described above, a stable clock signal can be obtained from the radiation supplied by the pulsed laser after injection by means of known electrical methods, because only the relevant part of the pulses of the signal pulse series to be received is applied to the pulsed laser and is sampled. In this way, intensity noise and time jitter are eliminated from the signal pulse series at the instant when the clock regeneration starts. Since only a sample of a pulse injected into the laser 11 is taken, the pulses thus produced have the same shape and intensity and may consequently be detected substantially without any error. The comparison between the modulation period of the signal pulse series to be regenerated and the distance with respect to time between pulses supplied by the pulsed laser 11 after injection is realised in the pulsed laser 11 itself. The two pulse distances are matched by controlling the beat signal supplied by the pulsed laser 11 after injection towards zero.

As already mentioned hereinbefore, the above-described optical unit for restoring at least a plurality of a pulse pattern may be used in the receiver of an optical transmission system for deriving the clock signal in a stable manner from the data pattern reaching the receiver.

Figure 3:
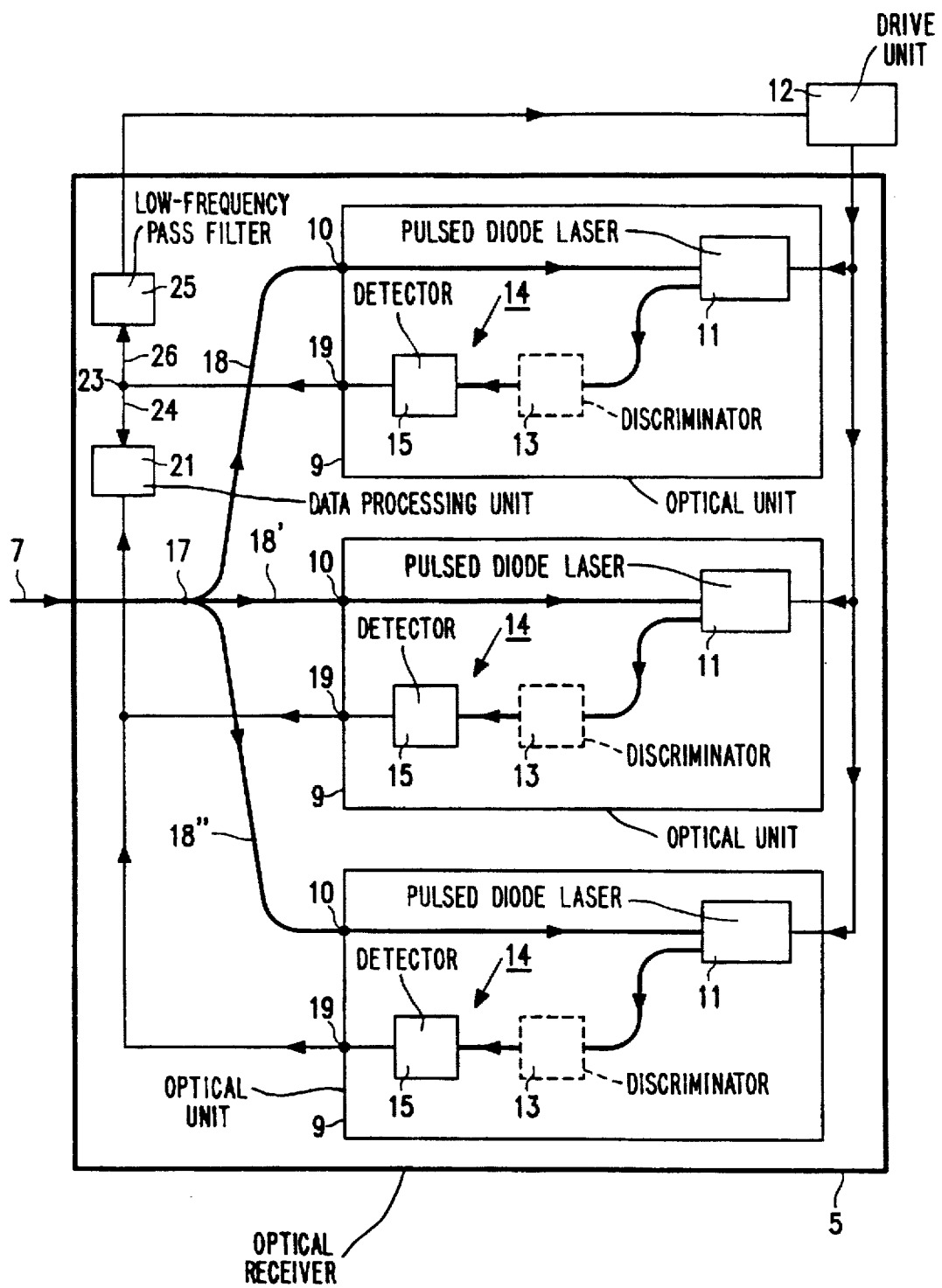
FIG. 3 shows diagrammatically an optical receiver provided with a plurality of optical units according to the invention for demultiplexing a transported data signal.

Moreover, the optical unit according to the invention may also be used in the receiver as a demultiplexer. A composite signal which is transmitted through a single transmission channel in order to increase the transmission rate should be split again into separate signals which are subsequently detected. FIG. 3 shows an embodiment of an optical receiver 5 which comprises a plurality of optical units 9 according to the invention for demultiplexing a composite signal transported through the transmission medium 7. This signal is split via an optical fiber coupling 17 and a plurality of optical fibers 18, 18', 18" into a plurality of sub-signal pulse series which are each applied to a separate unit 9. The number of units 9 corresponds to the number of channels among which the signal is to be distributed. In the embodiment shown in the drawing this number is 3. A sub-signal pulse series is regenerated as described above in each of the units 9. For each of the pulsed lasers 11 the distance T' in time between two consecutive output pulses is, for example three times as long as the modulation period T of the Signal pulse series. The three lasers 11 are synchronized in such a way that, for example three consecutive pulses of the signal pulse series are each converted into an output pulse by a different pulsed laser 11. This may be realised, for example by connecting a single drive unit 12 (such as a single current source) to each unit 9 via three lines having adapted delay time differences. The sub-signal pulse series supplied at the outputs 19 of the units 9 can be processed by means of a single data-processing unit 21 which combines the three sub-signals, or by three separate data-processing units. In the first-mentioned case it is sufficient to measure the beat signal at only one of the pulsed lasers 11 and to feed it back to the single drive unit 12.

We claim:

1. An optical unit for restoring a pulse pattern, said optical unit comprising:
   an input for receiving a light signal pulse series at a modulation period T and wavelength $\lambda_p$; and
   a non-linear optical element for supplying a plurality of light pulses in accordance with the signal pulse series, wherein said non-linear optical element is a pulsed laser for supplying a light pulse series whose distance between two consecutive pulses is equal to n·T, wherein n is an integer and is variable throughout the pulse series, further wherein pulses of the signal pulse series are injected into the pulsed laser, said optical unit further comprising a detection system in a path of a radiation emitted by the pulsed laser for measuring a variation of a feedback-sensitive parameter of the pulsed laser.

2. The optical unit as claimed in claim 1, wherein the pulses of the signal pulse series are injected into the pulsed laser at instants for which it holds that $E(P_m)>E(LP_i)$, wherein $E(P_m)$ is an energy injected into the laser at a relevant instant and $E(LP_i)$ is an energy for a dominant mode built up in the laser at a relevant instant.

3. The optical unit as claimed in claim 2, wherein said detection system comprises a wavelength discriminator.

4. The optical unit as claimed in claim 3, wherein the pulsed laser is a diode laser having a Fabry-Pérot resonant cavity with a natural wavelength which corresponds to the wavelength of the signal pulse series.

5. The optical unit as claimed in claim 2, wherein said detection system comprises an interferometer.

6. The optical unit as claimed in claim 2, wherein said detection system comprises a photodetector, the photodetector having an output signal comparable in pulse period and phase with a pulse period and phase of the pulse series supplied by the pulsed laser without injection.

7. The optical unit as claimed in claim 2, wherein the pulsed laser is a monomode laser.

8. The optical unit as claimed in claim 1, wherein said detection system comprises a wavelength discriminator.

9. The optical unit as claimed in claim 8, wherein the pulsed laser is a diode laser having a Fabry-Pérot resonant cavity with a natural wavelength which corresponds to the wavelength of the signal pulse series.

10. The optical unit as claimed in claim 1, wherein said detection system comprises an interferometer.

11. The optical unit as claimed in claim 1, wherein said detection system comprises a photodetector, the photodetector having an output signal comparable in pulse period and phase with a pulse period and phase of the pulse series supplied by the pulsed laser without injection.

12. The optical unit as claimed in claim 1, wherein the pulsed laser is a monomode laser.

13. A transmission system comprising a transmitter and a receiver with a transmission medium in between, wherein said receiver comprises an optical unit for restoring a pulse pattern, said optical unit comprising:

an input for receiving a signal pulse series at a modulation period T and wavelength $\lambda_p$; and a non-linear optical element for supplying a plurality of pulses in accordance with the signal pulse series, wherein said non-linear optical element is a pulsed laser for supplying a pulse series whose distance between two consecutive pulses is equal to n·T, wherein n is an integer and is variable throughout the pulse series, further wherein pulses of the signal pulse series are injected into the pulsed laser, said optical unit further comprising a detection system in a path of a radiation emitted by the pulsed laser for measuring variation of a feedback-sensitive parameter of the pulsed laser.

14. A receiver for use in a transmission system, said receiver comprising an optical unit for restoring a pulse pattern, said optical unit comprising:

an input for receiving a signal pulse series at a modulation period T and wavelength $\lambda_p$; and a non-linear optical element for supplying a plurality of pulses in accordance with the signal pulse series, wherein said non-linear optical element is a pulsed laser for supplying a pulse series whose distance between two consecutive pulses is equal to n·T, wherein n is an integer and is variable throughout the pulse series, further wherein pulses of the signal pulse series are injected into the pulsed laser, said optical unit further comprising a detection system in a path of a radiation emitted by the pulsed laser for measuring variation of a feedback-sensitive parameter of the pulsed laser.

15. The receiver as claimed in claim 14, wherein a low-frequency pass filter and a voltage-controllable oscillator are arranged between the output of said detector and an input of the pulsed laser via which said laser is driven, wherein an output of the filter is connected to an input of the oscillator, further wherein an output of the oscillator is connected to the input of the pulsed laser for driving the laser.

* * * * *